United States Patent
Gathman et al.

(10) Patent No.: US 8,291,437 B2
(45) Date of Patent: Oct. 16, 2012

(54) SYSTEM AND METHOD FOR CONSOLIDATING MIDDLEWARE FUNCTIONALITY

(75) Inventors: Jonathan Chester Gathman, Arnold, MO (US); William Scott Bertrand, Belleville, IL (US); Robert William Gulledge, St. Charles, MO (US); Bhanu Ramesh, Fenton, MO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 12/895,974

(22) Filed: Oct. 1, 2010

(65) Prior Publication Data
US 2011/0023053 A1    Jan. 27, 2011

Related U.S. Application Data

(63) Continuation of application No. 11/513,309, filed on Aug. 31, 2006, now Pat. No. 7,836,459.

(51) Int. Cl.
G06F 3/00      (2006.01)
G06F 15/16     (2006.01)
G06F 15/173    (2006.01)

(52) U.S. Cl. .................. 719/320; 709/208; 709/226

(58) Field of Classification Search ............ None
See application file for complete search history.

(56) References Cited

U.S. PATENT DOCUMENTS

| | | | |
|---|---|---|---|
| 6,185,217 B1 * | 2/2001 | Ando et al. | 370/403 |
| 2003/0177240 A1 * | 9/2003 | Gulko et al. | 709/226 |
| 2004/0047298 A1 * | 3/2004 | Yook et al. | 370/254 |
| 2004/0131082 A1 | 7/2004 | Evans et al. | |
| 2004/0202296 A1 * | 10/2004 | Dokko | 379/114.01 |
| 2005/0004777 A1 * | 1/2005 | Houlihane | 702/119 |
| 2005/0166209 A1 * | 7/2005 | Merrick et al. | 719/310 |
| 2006/0020689 A1 | 1/2006 | Roman et al. | |
| 2006/0129560 A1 | 6/2006 | Adams et al. | |
| 2006/0159077 A1 | 7/2006 | Vanecek | |
| 2006/0271634 A1 | 11/2006 | England et al. | |
| 2006/0291433 A1 * | 12/2006 | Do et al. | 370/338 |
| 2007/0156897 A1 | 7/2007 | Lim | |
| 2008/0059559 A1 | 3/2008 | Gathman et al. | |

OTHER PUBLICATIONS

Ryan, "XML Processing with Java Object Technology", pp. 1-17, http://dev2dev.bea.com/lpt/a/350, May 4, 2004.

* cited by examiner

*Primary Examiner* — Lechi Truong
*Assistant Examiner* — Tuan Dao
(74) *Attorney, Agent, or Firm* — Greenblum & Bernstein, P.L.C.

(57) ABSTRACT

A method and server manage a consolidation of multiple middleware threads, by identifying types of a plurality of middleware, selecting a main middleware from the plurality of middleware, and initializing the main middleware as a main middleware thread. The managing also includes identifying other middleware from the plurality of middleware, based on a consolidated middleware functionality, and selecting slave middleware from the identified other middleware. The managing further includes initializing the slave middleware as slave middleware threads by the main middleware thread, such that each initialized slave middleware thread functions independently of the main middleware thread.

18 Claims, 5 Drawing Sheets

SYSTEM AND METHOD FOR CONSOLIDATING MIDDLEWARE FUNCTIONALITY

CROSS-REFERENCE TO RELATED APPLICATIONS

This is a continuation of U.S. patent application Ser. No. 11/513,309, filed on Aug. 31, 2006, now U.S. Pat. No. 7,836,459, issued on Nov. 16, 2010, the disclosure of which is expressly incorporated by reference in its entirety.

This application incorporates by reference in its entirety the disclosure of U.S. patent application Ser. No. 11/513,310, filed on Aug. 31, 2006, now abandoned.

BACKGROUND

1. Field of the Disclosure

The present disclosure relates to the field of middleware technology, and more particularly, to efficiently utilizing and managing multiple types of middleware.

2. Background Information

In client-server computing, supporting software known generally as middleware facilitates better and more efficient use of resources, and provides clients access to information to be served on an as-needed basis. Generally, middleware is a communications layer that allows software applications to interact across various hardware and network environments. Conventional types of middleware used in distributed computing include, for example, Common Object Request Broker Architecture (CORBA), Java Message Service (JMS) and WebServices, such as Simple Object Access Protocol (SOAP)/HTTP or SOAP/JMS. The different types may inhibit communication between clients and services that use different middleware types.

The basic functions of middleware may be logically grouped into transport, protocol, discovery and application management. Transport includes the means by which data and instructions are moved in a distributed environment. Examples of transport are transmission control protocol (TCP), JMS and HTTP. Protocol is an agreed upon formatting of data and instructions, so that both sides of a conversation understand the message contents. Examples of protocol include Internet Inter-Orb Protocol (IIOP) (used by CORBA) and SOAP. Encoding is essentially a subset of protocol, and is an agreed upon formatting for data. Examples of encoding include Common Data Representation (CDR) (used by CORBA), External Data Representation (XDR) and SOAP encoding. Discovery includes the means by which services advertise their availability and likewise clients find these services to use. Directories and name services such as LDAP and CORBA naming service are typical implementations. Application management has become a fourth middleware function, largely due to the relationship between managing the availability of a service and updating the directory when service availability changes. For example, application management includes registering service availability in the directory when it starts and un-registering the service when it stops.

The various middlewares function in different ways, but each essentially follows the same general pattern. First, a service corresponding to a particular interface is created and deployed on networked computing equipment. Second, a service process is started on the network, and "listens" for incoming client calls. Third, the service responds to a known, published or discoverable interface. Fourth, a service has a programmed element, known as an Implementation (e.g., business logic or, in the case of a proxy architecture, delegate), which is plugged into the middleware, and the middleware is responsible for handing off the network-sent communications and returning any required corresponding data. Fifth, the service's health is typically monitored, so that sick services can be restarted, or more service capacity can be added as needed by quantities of client interactions (collectively known as Service Management).

There are a number of types middleware that facilitate the transfer of data, for example, between clients and servers. All types of middleware have in common a point at which a message, gathered from the network, is transferred, for example, to a memory so that a programming language can reference it. Transforming the memory set into data structures or formats that the program is able to understand is called "marshalling." In other words, marshalling is the middleware act of transforming a program's native data representation to an encoding ready for transport.

Some middleware delivers raw data or messages from a client in either text (character based) or binary (byte forms). For example, JMS typically delivers text data, in either Extensible Markup Language (XML) or SOAP format. CORBA, on the other hand, typically delivers binary data and supports either XDR or CDR marshalling. Regardless of the type of middleware, the data must be understood by both the client and the server, at least in part, requiring an appropriate interface.

Currently, numerous types of middleware are available, generally having a wide variety of capabilities. Middleware such as CORBA and Enterprise JavaBeans (EJB) define transport, protocol and data marshalling as a whole. Middleware such as JMS only defines the transport and some elements of protocol. The freedom of message content in JMS has allowed the growth of text-based data forms, such as SOAP, in addition to the more traditionally defined binary formats, such as CDR, XDR and the like. Efficient enterprise integration of services requires that message content be transformed with as little human programming as possible. Accordingly, there are often multiple middlewares available within a single organization. Typically, either more than one service for each middleware is created, requiring multiple locations for the business logic to reside, or one service holds the business logic, requiring the other services to delegate calls to it (i.e., a proxy). These strategies require multiple deployments and management schemes.

Further, the variety of middlewares, created with a number of different strengths and followings, is significant. A computing entity, such as a business or other enterprise, may not have the funds and resources, or even the business drivers to keep trading all their existing services to multiple middlewares, especially in terms of the most recent technologies and trends. Additionally, while products are often created that can talk as a client to existing services, rarely do they address the fact that these existing resources may need to talk to the new services for legal or other business drivers. Thus, many enterprises find themselves needing to support access to key services in a variety of middlewares and data formats.

Accordingly, a need exists for efficiently integrating and/or coordinating the implementation, use and management of multiple different types of middleware.

BRIEF DESCRIPTION OF THE DRAWINGS

The present disclosure provides the detailed description that follows by reference to the noted drawings by way of non-limiting examples, in which like reference numerals represent similar parts throughout several views of the drawings, and in which.

DETAILED DESCRIPTION

Figure 1:
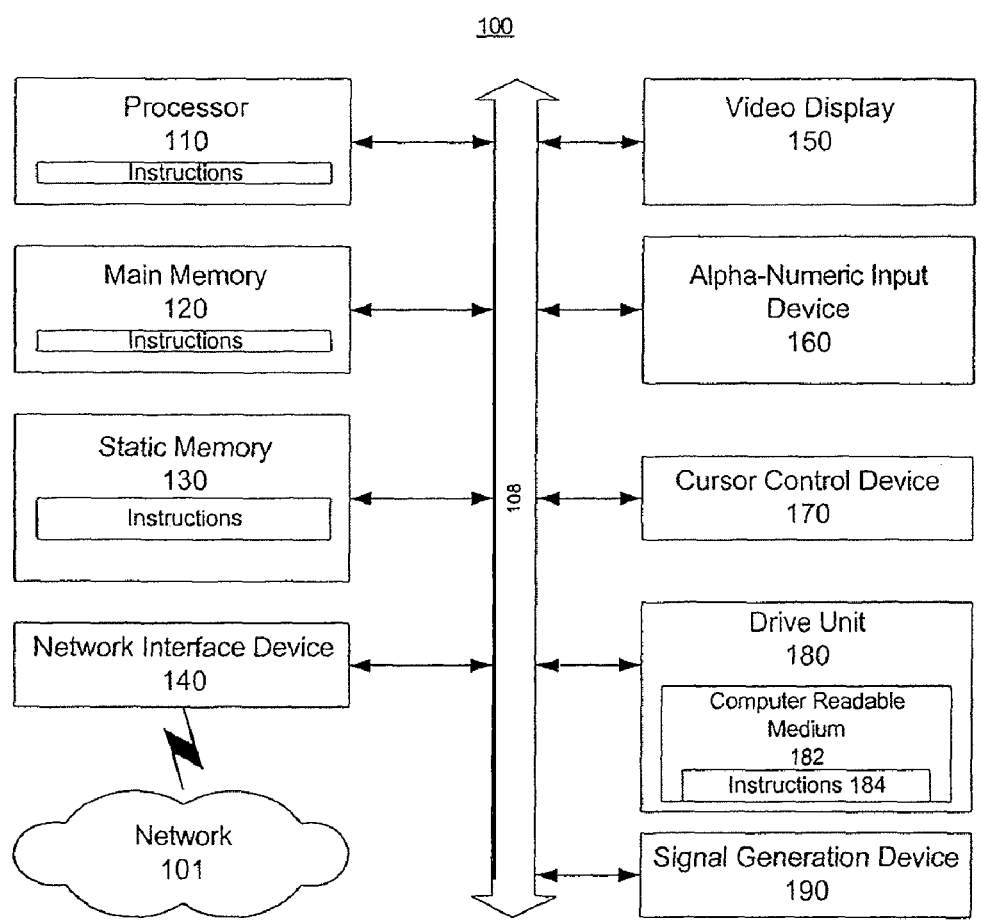
FIG. 1 shows an exemplary general computer system that includes a set of instructions for performing processing, according to an aspect of the present disclosure.

The present disclosure relates to the integration and management of various types of middleware. This includes two complementary processes: multi-layered marshalling of messages received from the various types of middleware and consolidated management of multiple middleware threads.

The multi-layered marshalling functionality logically resides between a generic message delivered by the operating middleware and an application's Implementation, as defined by an interface. The multi-layered marshalling creates a set of layered transformations that, at runtime, evaluates the kind or format of message coming in on the service side (e.g., text or binary), and runs the incoming message through a series of decisions, transformations, logging and other required steps to transform from an "on-the-wire" format to usable Java objects. The Java objects call the implementation (e.g., the business logic or delegate), which executes its corresponding logic accordingly. In other words, multi-layered marshalling converts raw data from the point of the middleware application program interface (API) and performs a series of transformations until the data is able to be called as a form of arguments to an interface described in Metadata.

After execution, the series of transformations and logging steps may be performed in reverse order to convert responsive messages back to the wire format. In an embodiment, the same Layer objects may be used to enable the client side, upon writing to the interface, to transform the Java objects to the wire format, and from the wire format to Java objects on the reply. For example, this layer framework may consist of objects derived from an interface called a "Layer," which passes an object derived from an interface called "Record" to the next Layer as determined by either a simple "next Layer" mechanism for transformations and logging, or a decision Layer.

The complementary consolidated middleware management functionality logically resides between multiple middlewares and the business logic or delegate. The consolidated middleware management enables multiple middleware threads to be managed through management of a single middleware, even where the multiple threads comprise different types of middleware. After the main middleware is initialized, the consolidated middleware management process determines which other middlewares are to be supported as slave threads, and becomes the instantiator of each of the slave threads. Then, only the main middleware thread is managed directly, while the slave middleware threads are managed indirectly in conjunction with the main thread. Otherwise, the consolidated middleware management process does not affect the functionality and operation of each of the middlewares.

The multi-layered marshalling and the consolidated middleware management are complementary in that records from multiple middlewares, running contemporaneously, may be received and marshaled through a multilayered process. Meanwhile, these multiple middlewares may be contemporaneously managed through management of a single, main middleware thread, rather than independently managed. In an embodiment, the multi-layered marshalling and the consolidated middleware management processes are provided in a single network management product.

In view of the foregoing, the present disclosure, through one or more of its various aspects, embodiments and/or specific features or sub-components, is thus intended to bring out one or more of the advantages as specifically noted below.

An aspect of the present disclosure provides a method for marshalling data from multiple middleware applications to an implementation. The method includes receiving first data from a first middleware application, the first data having a first format of multiple available formats; selecting a first path from multiple paths based on the first format, the paths corresponding to the multiple available formats; and converting the first data from the first format to a common format based on the selected first path, the common format being compatible with the implementation. The method may further include receiving second data from a second middleware application, the second data have a second format of the multiple available formats; selecting a second path from the multiple paths based on the second format; and converting the second data from the second format to the common format based on the selected second path.

The first format may include a text-based format or a binary-based format. Also, the middleware applications may include at least one of a JMS application and a CORBA application. The first middleware application may include the JMS application, and the first format may include an XML format and a SOAP format. Alternatively, the first middleware application may include the CORBA application, and the first format may include an XDR format or a CDR format. The common format may be a Java format, and the implementation may include a business logic or a delegate.

Another aspect of the present disclosure provides a computer readable medium that stores a program for marshalling data from multiple middleware applications to an implementation. The computer readable medium includes a receiving code segment, a selecting code segment and a converting code segment. The receiving code segment receives first data from a first middleware application, the first data having a first format of a multiple available formats. The selecting code segment selects a first path from multiple paths based on the first format, the paths corresponding to the available formats. The converting code segment converts the first data from the first format to a common format based on the selected first path, the common format being compatible with the implementation. The receiving code segment may further receive second data from a second middleware application, the second data have a second format of the available formats; the selecting code segment may further select a second path from the plurality of paths based on the second format; and the converting code segment may further convert the second data from the second format to the common format based on the selected second path.

The first format may include, for example, a text-based format or a binary-based format. Also, the multiple middleware applications may include a JMS application, a CORBA application, or the like. For example, the first middleware application may be the JMS application, and the first format may be an XML format or a SOAP format. Alternatively, the first middleware application may be the CORBA application, and the first format may be an XDR format or a CDR format. The common format may be a Java format, for example. The implementation may be a business logic or a delegate.

Yet another aspect of the present disclosure provides a computer readable medium that stores a program for marshalling data from a plurality of middleware applications to an implementation through a predetermined logical framework including multiple process layers. The computer readable medium includes a determining code segment, including a first logical layer, for determining a first path from multiple paths based on a first type of data received from a first middleware application; and a first marshalling code segment, including a second logical layer and corresponding to the first path, for determining a first marshalling method for marshalling the first type of data to a common format, which is compatible with the implementation. The determining code segment may further determine a second path from the multiple paths based on a second type of data received from a second middleware application. In this case, the computer readable medium further includes a second marshalling code segment, including a third logical layer and corresponding to the second path, the second marshalling code segment determining a second marshalling method for marshalling the second type of data to the common format.

The various aspects and embodiments of the present disclosure are described in detail below.

Referring to FIG. 1, a description is now provided of an illustrative embodiment of a general computer system 100, on which the multi-layered marshalling process and/or the consolidated middleware management process can be implemented. The computer system 100 can include a set of instructions that can be executed to cause the computer system 100 to perform any one or more of the methods or computer based functions disclosed herein. The computer system 100 may operate as a standalone device or may be connected, e.g., using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, e.g., a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g., software, can be embedded. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal, so that a device connected to a network 101 can communicate voice, video or data over the network 101. Further, the instructions 184 may be transmitted or received over the network 101 via the network interface device 140.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Using a general computer system as shown in FIG. 1, a process for multi-layered marshalling and/or the consolidated middleware management may be provided. The system of FIG. 1 can also operate as various elements within a network. For example, a program implementing the disclosure may be loaded and executed on one or more web servers. Alternatively, the program may be run locally on a PC or a server dedicated to a particular user group or region.

Figure 2:
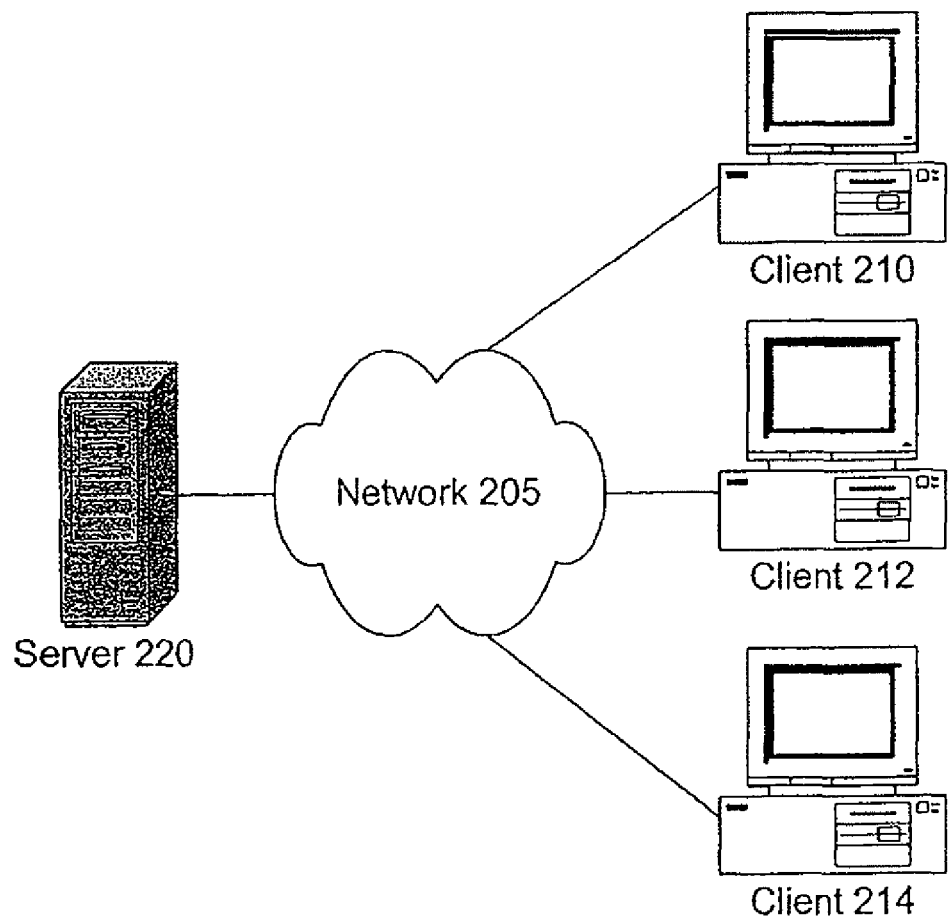
FIG. 2 shows an exemplary architecture of a server-client implementation, according to an aspect of the present disclosure.

For instance, FIG. 2 shows an exemplary architecture of a server-client implementation of the multi-layered marshalling process and/or the consolidated middleware management process, according to an embodiment of the present disclosure. FIG. 2 shows multiple clients, client 210, client 212 and client 214 in communication with a server 220 through a communications network 205 using known server-client communication techniques. The clients 210, 212 and 214, and the server 220 are computer systems, for example, as described above with respect to FIG. 1, and may consist entirely of software. The application software implementing the multi-layered marshalling process and/or the consolidated middleware management process runs on the server 220 and may be accessible to multiple clients communicating via various middleware programs. For example, client 210 may be in communication using CORBA middleware, client 212 may be in communication using JMS middleware and client 214 may be in communication using any other middleware, such as Datagate. However, in alternative embodiments, the application software may reside on the client 210, e.g., an IBM compatible PC, without departing from the spirit and scope of the present disclosure. Likewise, in an embodiment of the disclosure, the communications network 205 may be a packet switching network, such as the Internet. In alternative embodiments, the communications network 205 may include local networks, such as a corporate intranet or Ethernet, without departing from the spirit and scope of the present disclosure.

Figure 3:
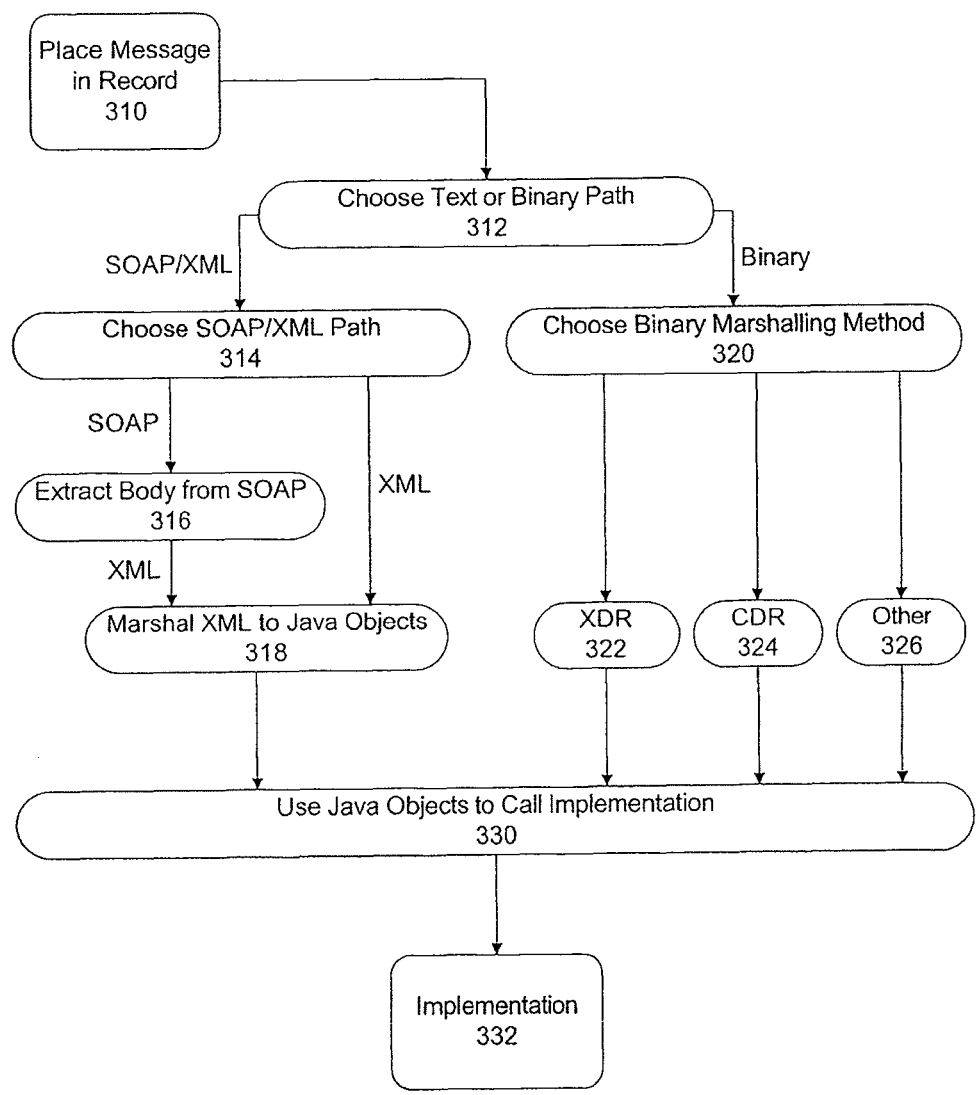
FIG. 3 shows an exemplary flowchart and layering architecture of a multi-path marshalling process, according to an aspect of the present disclosure.

FIG. 3 is an exemplary flow diagram according to an aspect of the present disclosure, showing sample functionality of the multi-layered marshalling process, as implemented, for example, on the server 220 shown in FIG. 2. The marshaling addresses the protocol layer, discussed above, which may be either locked in entirely or totally undefined. Each oval of FIG. 3 depicts a small process layer, easily related to one another. In an embodiment, implementation of the layers is based on the "Decorator Pattern," defined in Gamma et al., "Design Patterns" (Edison Wesley) (1995), the contents of which are incorporated herein by reference in the entirety. Further, additional layers may be included for logging, etc., as part of the implementation. Each oval likewise represents a step in the marshalling process, and will be referred to as steps in the discussion below.

At step 310, a message received via a particular type of middleware is placed in a record. For example, a JMS API delivers a generic message, which is placed in a Record object, initiating the marshalling process. The Record object encapsulates the essence of the middleware message, and carries along the data between the structured Layers. Each individual Layer performs a discrete transformation of the data, suitable to be the input of next step in the flow. At step 312, a text or binary data path is selected depending on the type or format of data presented. For example, JMS provides text messages, while CORBA provides binary messages. The determination of whether the received message is text or binary may be made based on sampling the received data or identifying the type of middleware, for example.

When the received message is text, such as XML or SOAP formatted data, the process proceeds to step 314, which further determines the type of text data. For example, in the case of JMS middleware, it may be determined at step 314 whether the text message is simple XML or SOAP. When the text is determined to be XML, the process proceeds directly to step 318, at which the XML data is marshaled to Java objects. The XML is transformed into Java objects using any appropriate tool, such as Java Architecture for XML Binding (JAXB) or the process described in U.S. patent application Ser. No. 11/140,576, filed on May 27, 2005, entitled "System and Method for Simple Object Access Protocol access to Interface Definition Language Based Services," the contents of which are incorporated herein by reference in the entirety.

When the text is determined to be SOAP, the process first proceeds to step 316, in which the XML formatted body of the SOAP message is extracted. Then, this XML data is marshaled to Java objects at step 318 using the same path as the raw XML data provided directly from step 314. The Java objects may interface with the Implementation 332.

When at step 312 it is determined that the received message is binary (e.g., when the middleware is CORBA), an appropriate binary marshalling method is chosen at step 320. For example, the marshalling method selected may be XDR implemented at step 322, CDR implemented at step 324 or other binary marshalling method implemented at step 326, each of which marshals the binary data to Java objects, compatible with the Implementation 332. Again, a particular transformation or marshalling step may rely on existing compatible interface tools, such as Interface Definition Language (IDL) based interfaces. The selection of the marshalling method depends on format of the message data.

At step 330, the Java objects are use to call the implementation. The origin of the Java objects (e.g., XML formatted text, SOAP formatted text, binary, etc.) are irrelevant, with respect to the implementation, which sees only the Java objects. The implementation is interfaced to the Implementation at step 332. A reply (not pictured) by the Implementation flows back along the same call stack as that depicted in FIG. 3. Single call marshalling (e.g., notification) may be supported by simply not processing a Record on the way back through the Layer stack.

The marshalling process discussed above enables various forms of data, determined at runtime, and multiple kinds of marshalling to be accepted at the same time with respect to the same service. Also, the various layers of code, such as the transformation from an XDR binary stream into Java objects (e.g., step 322), need to be created only once and may be reused, as needed, in a clearly defined and efficient manner based on the operating middlewares. When a new transformation or marshalling process is needed, it may be added to the existing framework (e.g., FIG. 3) as a separate process layer and implemented as part of the multi-layered marshalling process. In other words, the process layers are modular to the extent they function independently within the overall multi-layered framework.

An enterprise is provided significant flexibility regarding the types of middleware that it implements and supports and, as a practical matter, reduces the strain of coordinating new large scales releases. For example, the multi-layered marshalling process enables communications based on binary-based messaging internal to the enterprise, which is almost twice as fast as text-based messaging, while maintaining the ability to communicate via traditional XML and XML-based languages, such as Web Service Description Language (WDSL). Therefore, for example, the enterprise may provide XML/WSDL access for external uses and CORBA for internal uses, thus reducing time, load and overall computer expenses by using more efficient binary messaging when possible, while not having to deploy or maintain additional services.

In an embodiment, clients may be given a choice to use the optimum marshalling for greater transactional speed (e.g., binary-based), yet maintain compatibility with XML for Web services (e.g., XML-based). Further, the marshalling process enables existing services to be easily fitted for new marshalling mechanisms, such as binary XML, as they are developed and otherwise become available, without having to recode existing clients or services. The new marshalling format may be supported simply by updating the multi-layered marshalling framework with new transformation layers, and placing them in the network.

In addition to having to marshal messages from different middlewares, an enterprise may also need to support and manage or require contemporaneous use of numerous kinds of middleware, which is addressed by the consolidated middleware management process of the present disclosure. Typically, each service is designed or implemented to use a particular middleware, and requires separate deployment, write-up and execution. More particularly, the service consists of a process that includes the transport module or functionality of the middleware. Also, each middleware is managed separately. For example, referring to FIG. 2, the client 210 may communicate with a corresponding service via CORBA managed by a CORBA manager; the client 212 may communicate with a corresponding service via JMS, managed by a separate JMS manager; and client 214 may communicate with a corresponding service via another middleware, such as Datagate, managed by yet another separate manager. In an embodiment, each of the services implement the same business logic.

The consolidated middleware management process of the present disclosure enables services to use different types of middleware in addition to the one expected by the middleware package. This reduces costs associated with deployment and maintenance of the services, and potentially eliminates the need for costly retrofitting of existing clients and services in the enterprise's computing portfolio. This especially advantageous when the retrofitting provides no real additional value, other than to continue expected functionality within the organization. Further, the consolidated middleware management process provides the same services and corresponding qualities of service provided by running multiple services with the same business logic, while reducing the actual number of deployments and management needs. Thus, the consolidated middleware management process directly affects the topology of a given suite of services that would have the same definitions, but be deployed on different middlewares.

Figure 4:
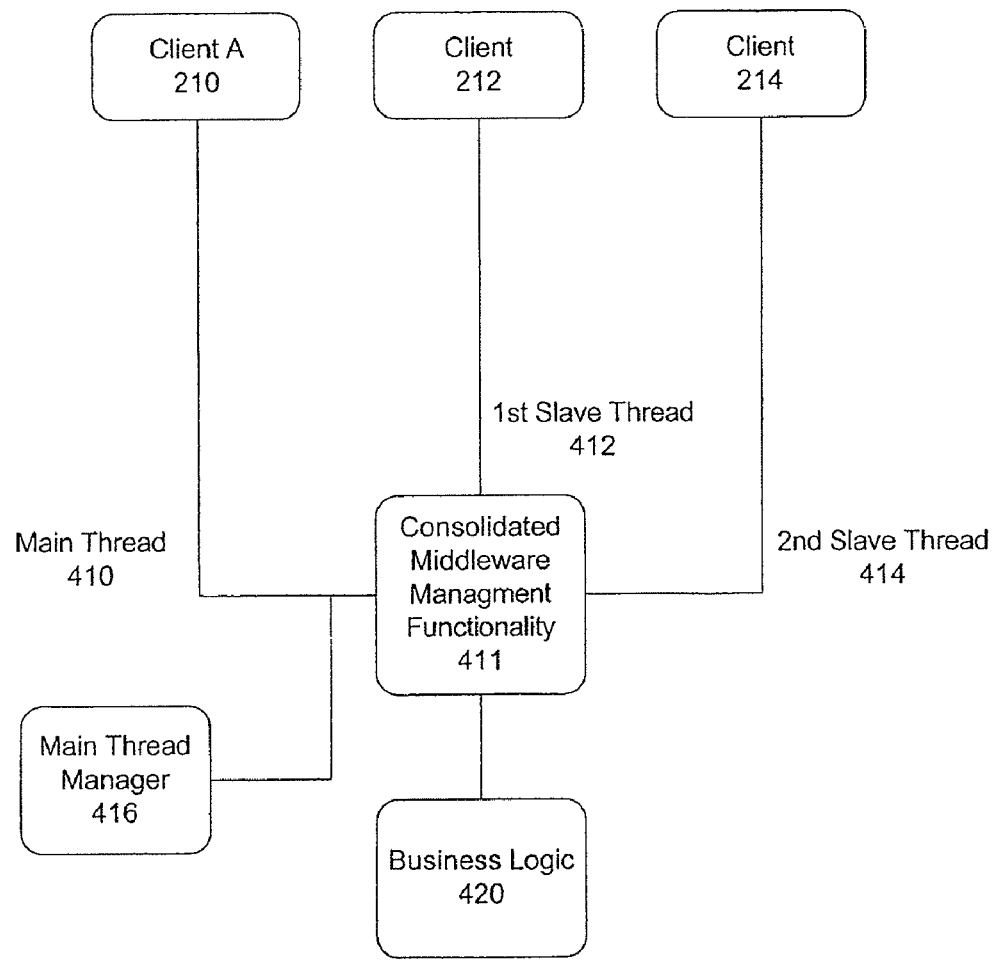
FIG. 4 shows an exemplary architecture of a consolidated middleware management implementation, according to an aspect of the present disclosure.

FIG. 4 shows an exemplary architecture of the consolidated middleware management process, according to an aspect of the present disclosure. The consolidated middleware management functionality itself is depicted by block 411, with which the clients 210, 212 and 214 communicate. As discussed above, client 210 still communicates using CORBA, client 212 still communicates using JMS and client 214 still communicates using some other middleware. However, in the depicted embodiment, the CORBA connection (from client 210) has been chosen to be the main thread 410 for communicating with the Business Logic 420, and thus requiring deployment only for the main thread 410. Meanwhile, the JMS connection (from client 212) is initiated as the first slave thread 412 and the other middleware connection (from client 214) is initiated as the second slave thread 414.

Only the main thread 410 is deployed and directly managed, i.e., by the main thread manager 416. The first slave thread 412 and the second slave thread 414 have no dedicated management, and are thus indirectly managed in accordance with the management of the main thread 410. For example, when the main thread 410 is started, the first slave thread 412 and the second slave thread 414 are also started. Likewise, when the main thread 410 is ended, the first slave thread 412 and the second slave thread 414 are also ended. Each of the clients sees no difference in contacting and communicating with the service.

Figure 5:
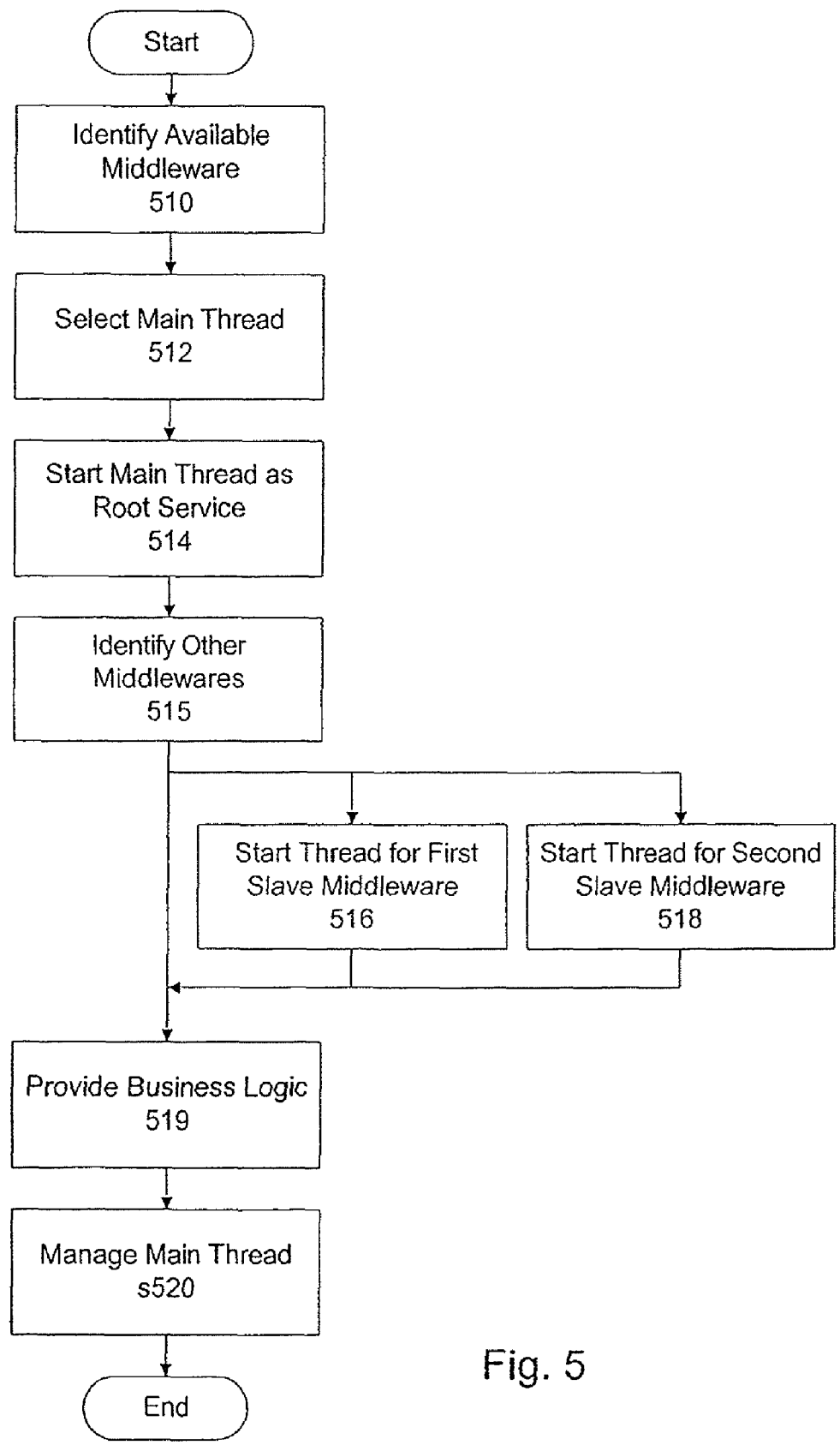
FIG. 5 shows an exemplary flowchart of the consolidated middleware management process, according to an aspect of the present disclosure.

FIG. 5 shows an exemplary flowchart of the consolidated middleware management process, according to an aspect of the present disclosure. At step 510, the available types of middleware are identified, for example, CORBA and JMS. A main middleware is selected from among the identified middleware at step 512. The main middleware may be CORBA, for example, as depicted in the exemplary architecture of FIG. 4.

In an embodiment, the consolidated middleware management functionality 411 starts at the initialization stage of the chosen main middleware, and a main middleware thread is started as a root service at step 514. At the point of initialization, the consolidated middleware management functionality 411 passes in the appropriate instructions for the Business Logic 420, as well as any handlers. The consolidated middleware management functionality 411 also determines what other middlewares are to be supported as slave threads at step 515. The consolidated middleware management functionality 411 then becomes the instantiator of the slave threads, and starts the initialization process of the first slave thread and the second slave thread at steps 516 and 518, respectively. Of course, the consolidate middleware management process is intended to support any number of slave threads, without departing from the spirit or scope of the present disclosure. In an alternative embodiment, all of the threads can be started at the same time. All of the configurations necessary for each middleware may be accomplished with a single configuration file, which either points to or contains the respective middleware registrations and other requirements, such as, for example, Lightweight Directory Access Protocol (LDAP) registrations and CORBA NameService registrations.

The same business logic tree, e.g., of the Business Logic 420, is provided to each middleware at step 519. In an embodiment, the Business Logic 420 is brought up as an instance for each middleware. The main thread 410 is then managed at step 520. The slave threads 412 and 414 are managed in accordance with the management of the main thread 410. Thus, all of the listening entities are able to be managed by the single management functionality for the root service.

Once started, each middleware then functions according to its nature. They are visible by their respective directory mechanisms, and treated as such by their respective clients. In an embodiment, each middleware shares a common Metadata definition, so that the Implementation (e.g., the Business Logic 420) for each is the same. The consolidated middleware management functionality plays no part in the various transactions or communications, but rather address only lifecycle.

In other words, the consolidated middleware management comes into play only at times when the service is to be controlled, for example, by the main thread manager 416. For example, when the main thread is instructed to close or shut down, the consolidated middleware management functionality 411 calls the equivalent of a "shut down" instruction on each of the slave threads 412 and 414, performing the requirements associated with the associated kind of middleware, so that each thread is closed correctly. These requirements may include, for example, deregistering from a directory service, a name service or other enterprise-wide resource, closing file accesses, deregistering from a local orb (e.g., for CORBA), and the like. After each slave thread is ended (and errors in shut down handled), the shut down for the main thread 410 is performed before exiting.

In an embodiment, the consolidated middleware management functionality 411 may function within a proxy architecture. A proxy is a pattern where additional services are run in the different types of middleware, but the business logic is actually delegated to a client of the real service. The consolidated middleware management functionality 411 can be a form of proxy in which, all the business logic, e.g., Business Logic 420, is a delegated to another service, e.g., an EJB. Thus, by having the Business Logic 420 be a Delegate to middleware of an existing type, yet providing middleware access for multiple supported types, deployment and management may be simplified to the fewest number of instances possible.

A disadvantage of implementing a conventional proxy is that it requires another "network hop," resulting in additional time needed to delegate to a separate service. Also, there is some additional risk of downtime, since there are two additional services in the chain. However, using the consolidated middleware management functionality 411, there are no additional network hops, since each middleware thread can serve directly to the Business Logic 420. This saves network time and may reduce topological complexity. For example, using conventional proxy architecture, it may be difficult for a client to know whether reported errors originate with the proxy or with the delegate, due to the additional network hops.

Although FIGS. 3 and 5 depict particular sequences of steps, it is understood that the sequences are exemplary to the associated embodiments, and are not intended to be limiting. For example, in alternative embodiments, the order of the steps may differ, or the various steps may occur simultaneously, without affecting the spirit and scope of the disclosure. Also, although depicted linearly, the various embodiments may be implemented through various programming techniques with appropriate arrangements.

Although the present specification describes components and functions that may be implemented in particular embodiments with reference to particular standards and protocols, the invention is not limited to such standards and protocols. Each of the standards, protocols and languages represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the spirit and scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments that fall within the true spirit and scope of the present disclosure. Thus, to the maximum extent allowed by law, the scope of the invention is to be determined by the broadest permissible interpretation of the following claims and their equivalents, and shall not be restricted or limited by the foregoing detailed description.

Although several exemplary embodiments have been described, it is understood that the words that have been used are words of description and illustration, rather than words of limitation. Changes may be made within the purview of the appended claims, as presently stated and as amended, without departing from the spirit and scope of the invention in its aspects. Although the description refers to particular means, materials and embodiments, the invention is not intended to be limited to the particulars disclosed, but rather extends to all functionally equivalent structures, methods, and uses such as are within the scope of the appended claims.

We claim:

1. A method for managing a consolidation of multiple middleware threads, comprising:
   identifying types of a plurality of middleware;
   selecting a main middleware from the plurality of middleware;
   initializing, by a server, the main middleware as a main middleware thread;
   identifying, by the server, other middleware from the plurality of middleware, based on a consolidated middleware functionality;
   selecting, by the server, slave middleware, different from the main middleware thread, from the identified other middleware, wherein at least one selected slave middleware is of a different type of middleware than the main middleware, and the main middleware and the slave middleware share a common metadata definition, such that business logic for the main middleware and each of the slave middleware is the same; and
   initializing the slave middleware as slave middleware threads by the main middleware thread,
   wherein each initialized slave middleware thread functions independently of the main middleware thread, and
   wherein the all necessary configurations for the main middleware and the slave middleware are stored in a single configuration file in a storage at the server, the single configuration file comprising information regarding middleware registrations for the main middleware and the slave middleware.

2. The method according to claim 1, further comprising:
providing the business logic to the main middleware and the slave middleware.

3. The method according to claim 2, further comprising:
assuming control, by the main middleware thread, of each functioning slave middleware thread, and shutting down each functioning slave middleware thread by the main middleware thread.

4. The method according to claim 3,
wherein the main middleware thread shuts down after each functioning slave middleware thread is shut down.

5. The method according to claim 4,
wherein identified errors in shutting down each functioning slave middleware thread are managed before the main middleware thread is shut down.

6. The method according to claim 4,
wherein the selected slave middleware are initialized sequentially.

7. The method according to claim 4,
wherein the selected slave middleware are initialized at the same time.

8. The method according to claim 4,
wherein the slave middleware have different formats, including a text-based format and a binary-based format.

9. A non-transitory computer-readable storage medium that stores a computer-executable program for managing a consolidation of multiple middleware threads, comprising:
a middleware identification segment for identifying types of a plurality of middleware;
a main middleware selecting segment for selecting a main middleware from the plurality of middleware;
a main middleware initializing segment for initializing the main middleware as a main middleware thread;
an other middleware identifying segment for identifying other middleware from the plurality of middleware, based on a consolidated middleware functionality;
a slave middleware selecting segment for selecting slave middleware, different from the main middleware thread, from the identified other middleware, wherein at least one selected slave middleware is of a different type of middleware than the main middleware, and the main middleware and the slave middleware share a common metadata definition, such that business logic for the main middleware and each of the slave middleware is the same;
and a slave middleware initializing segment for initializing the slave middleware as slave middleware threads by the main middleware thread,
wherein each initialized slave middleware thread functions independently of the main middleware thread, and
wherein all necessary configurations for the main middleware and the slave middleware are stored in a single configuration file in a storage at the server, the single configuration file comprising information regarding middleware registrations for the main middleware and the slave middleware.

10. The medium according to claim 9, further comprising:
a providing segment for providing the business logic to the main middleware and the slave middleware.

11. The medium according to claim 10, further comprising:
a control segment for assuming control, by the main middleware thread, of each functioning slave middleware thread, and shutting down each functioning slave middleware thread by the main middleware thread.

12. The medium according to claim 11,
wherein the main middleware thread shuts down after each functioning slave middleware thread is shut down.

13. The medium according to claim 12,
wherein the slave middleware have different formats, including a text-based format and a binary-based format.

14. A server for managing a consolidation of multiple middleware threads, comprising:
a receiver for receiving a plurality of middleware;
a processor for identifying types of the plurality of middleware;
a storage for storing the plurality of middleware,
wherein the processor selects a main middleware from the plurality of middleware;
wherein the processor initializes the main middleware as a main middleware thread;
wherein the processor identifies other middleware from the plurality of middleware, based on a consolidated middleware functionality;
wherein the processor selects slave middleware, different from the main middleware thread, from the identified other middleware, and at least one selected slave middleware is of a different type of middleware than the main middleware, and the main middleware and the slave middleware share a common metadata definition, such that business logic for the main middleware and each of the slave middleware is the same;
wherein the processor initializes the slave middleware as slave middleware threads by the main middleware thread, and
wherein each initialized slave middleware thread functions independently of the main middleware thread, and
wherein all necessary configurations for the main middleware and the slave middleware are stored in a single configuration file in the storage, the single configuration file comprising information regarding middleware registrations for the main middleware and the slave middleware; and
a transmitter for communicating with client computers.

15. The server according to claim 14,
wherein the computer processor provides the business logic to the main middleware and the slave middleware.

16. The server according to claim 15,
wherein the main middleware thread assumes control of each functioning slave middleware thread, and shuts down each functioning slave middleware thread by the main middleware thread.

17. The server according to claim 16,
wherein the main middleware thread shuts down after each functioning slave middleware thread is shut down.

18. The server according to claim 17,
wherein the slave middleware have different formats, including a text-based format and a binary-based format.

* * * * *